(12) United States Patent
Bos

(10) Patent No.: US 7,437,219 B2  
(45) Date of Patent: Oct. 14, 2008

(54) METHOD FOR THE PREVENTION OF MOTION SICKNESS, AND APPARATUS FOR DETECTING AND SIGNALING POTENTIALLY SICKENING MOTIONS

(75) Inventor: Jelte Egbert Bos, Driebergen (NL)

(73) Assignee: Nederlandse Organisatie Voor Toefepast Natuurwetenschappelijk Onderzoek Tno, Delft (NL)

( * ) Notice: Subject to any disclaimer, the term of this patent is extended or adjusted under 35 U.S.C. 154(b) by 198 days.

(21) Appl. No.: 10/505,111

(22) PCT Filed: Feb. 18, 2003

(86) PCT No.: PCT/NL03/00119

§ 371 (c)(1),  
(2), (4) Date: Mar. 30, 2005

(87) PCT Pub. No.: WO03/068564

PCT Pub. Date: Aug. 21, 2003

(65) Prior Publication Data

US 2005/0159865 A1  Jul. 21, 2005

(30) Foreign Application Priority Data

Feb. 18, 2002 (NL) .................................... 1019989

(51) Int. Cl.  
*G06F 17/00* (2006.01)

(52) U.S. Cl. ................. 701/1; 701/29; 340/945

(58) Field of Classification Search .............. 701/1, 701/23, 29; 340/945; 600/27, 28

See application file for complete search history.

(56) References Cited

U.S. PATENT DOCUMENTS

| 2,334,018 | A | | 11/1943 | Mayne |
| 4,930,435 | A | | 6/1990 | Newman |
| 6,042,533 | A | * | 3/2000 | Kania ........................ 600/27 |
| 6,692,428 | B1 | * | 2/2004 | Kania ........................ 600/27 |
| 6,866,225 | B2 | * | 3/2005 | Jones et al. .............. 244/118.5 |

OTHER PUBLICATIONS

Patent Abstracts of Japan, Mori Takashi, Seasickness Preventive Device, Application No. 59007804, filed Jan. 19, 1984, Publication No. 60151195, published on Aug. 9, 1985.

* cited by examiner

*Primary Examiner*—Gertrude Arthur Jeanglau  
(74) *Attorney, Agent, or Firm*—Lucas & Mercanti, LLP

(57) ABSTRACT

A method for the prevention of motion sickness in occupants of a vehicle, wherein a motion sickness indicator is fitted in the vehicle, which indicator indicates whether the vehicle motions experienced by the occupants during use can cause motion sickness, wherein the information coming from the indicator is fed back to a driver or a steering system of the vehicle, all this in such a manner that the driver or steering system can adjust the steering of the car in such a manner that the sickening motions are minimized. Further more, the invention relates to a motion sickness indicator suitable for a method according to the invention, comprising a transducer for measuring a relevant parameter for motion sickness, evaluation means for comparing the measured motion parameter with empirical data concerning the sickening effect of comparable motion parameters, on the basis of which the sickening effect of the measured parameter can be estimated, and rendering means for presenting an outcome obtained by means of the evaluation tools to the user in a suitable manner.

18 Claims, 2 Drawing Sheets

METHOD FOR THE PREVENTION OF MOTION SICKNESS, AND APPARATUS FOR DETECTING AND SIGNALING POTENTIALLY SICKENING MOTIONS

This patent application claims the benefit of priority from Dutch Patent Application No. NL 1019989 filed Feb. 18, 2002 through PCT Application Serial No. PCT/NL03/00119 filed Feb. 18, 2003, the contents of each of which are incorporated herein by reference.

BACKGROUND OF THE INVENTION

1. Field of the Invention

The invention relates to a method for the prevention of motion sickness, and an apparatus for detecting and signaling potentially sickening motions suitable for application in a method according to the invention.

2. Description of Related Art

Motion sickness can arise when a person is exposed to one or more specific motions for a longer period of time. In addition, factors such as temperature, smell, mood and digestion can play a catalyzing role. The best-known forms of motion sickness are sea sickness and car sickness. Especially the latter variant occurs frequently, in particular in children. Many solutions have already been proposed to control motion sickness in general, and car sickness in particular.

For example, there are pharmaceutical preventatives on the market, which need to be ingested some time before a drive and then help to suppress the motion sickness and the accompanying clinical picture, such as nausea. These known preventatives are generally not without side effects and so they are not suitable for every one or in every situation. This is also why the preventatives are less suitable for frequent, for example daily use. In addition, it is inherent to their preventative nature that, in part of the cases, these preventatives will be taken unnecessarily, since they need to be ingested at a moment when it is not certain at all yet whether one will be motion sick during the drive involved.

Further, from various patents, for example U.S. Pat. No. 5,647,835 and U.S. Pat. No. 5,161,196, car sickness preventatives are known, whose action is based on deception of the senses, particularly sight and hearing. Specific auditory or visual signals are blocked or replaced with artificial, non-sickening sensory signals. For instance, it is known to present passengers with an artificial visual and/or auditory horizon. However, these solutions require complicated, expensive equipment and thus seem little suitable for practical daily use, for example in a bus or passenger car.

BRIEF SUMMARY OF THE INVENTION

The object of this invention is a method for the prevention of motion sickness in occupants of a vehicle, wherein the abovementioned disadvantages of the known methods mentioned above have been avoided. For that purpose, a method according to the invention is characterized by the measures according to claim 1.

In a method according to the invention, a vehicle is provided with a motion sickness indicator, which, in an early stage, alerts a driver or a steering system of the vehicle to potentially sickening vehicle motions. On the basis of this information, the driver or steering system can change the steering of the vehicle in such a way that the sickening motions are avoided or, in any case, do not continue over a longer period of time. Thus, a method according to the invention does not involve intervention in the motion-sick person, as known preventatives and methods do, but primarily in the causative source, the vehicle motions. This has a number of advantages. For example, a method according to the invention is more efficient than many of the known preventatives, in that this method can help all occupants of a vehicle at the same time, without having to intervene in each of them separately. This is especially advantageous in large vehicles with many passengers, for example buses. Furthermore, this method causes no adverse side effects in the passengers and is thus suitable for every one, in every situation, as long and as often as needed. In addition, the method, in contrast to many of the known preventatives, has a wide practical applicability, since the method can be carried out with relatively simple auxiliary means (in particular a motion sickness indicator to be discussed in more detail below). These auxiliary means can simply be fitted in any vehicle or even to one of the passengers, without requiring radical adaptations. In order for the method to function properly, it is only important that the motions of the vehicle can be influenced by a driver or steering system of that vehicle to a sufficient degree. If desired, the method can simply be 'switched off', for example when none of the occupants is susceptible to motion sickness. In that case, the driver can simply ignore the information provided by the indicator or switch off the motion sickness indicator.

A suitable motion sickness indicator for the method can be embodied in various manners. In a simple embodiment, the indicator can comprise, for example, a mass spring system or a body immersed in a liquid that is at rest during permissible vehicle motions and is excited by sickening motions. Then the degree of excitation is a measure for the gravity of the sickening motion.

In a more advanced embodiment, the motion sickness indicator can comprise measuring, evaluation and rendering means, with which the vehicle motion, at any rate at least one of its relevant parameters for motion sickness, is measured and compared with permissible values or motion patterns that are stored in evaluation means. Then, the outcome of this comparison can be presented to the driver with the aid of suitable rendering means. Such a motion sickness indicator can accurately and timely identify sickening motions and, in addition, provide the driver with further information concerning, for example, the degree of sickening of the motions generated by his steering. In addition, the effect of correcting steering actions can be visualized directly.

In a further elaboration, a method according to the invention is characterized by the measures according to claims 3-5.

Research has shown that the acceleration of a motion is a relevant parameter for motion sickness. The acceleration can simply be measured and then compared with a relation between acceleration and motion sickness known from practice. It has been found that on the basis of an acceleration measured in only one direction, a correct prediction can already be made with regard to the sickening effect of a motion. Since motions in general and vehicle motions in particular can usually be provoking with regard to motion sickness in several directions, the accuracy of the prediction can be increased by measuring the acceleration of the vehicle motions three-dimensionally, in other words, in three orthogonal directions. Then the degree of sickening can be predicted for each separate direction. However, preferably one total acceleration signal is calculated on the basis of the three measured acceleration components, after which the prediction is based on this one signal. This provides has the advantage that the prediction needs to be performed for just one signal, while yet the influence of all three acceleration components is incorporated in this prediction. A second advantage is that this makes the orientation of the measuring means in relation to the vehicle irrelevant. This is favorable in particular when the motion sickness indicator is not integrated in the vehicle, but is to be fitted in the vehicle as a loose instrument.

In a particularly advantageous embodiment, a method according to the invention is characterized by the measures according to claim 6.

Further research of the applicant has shown that the relation between the acceleration of a motion and the degree to which this motion can cause motion sickness in an average person can be approximated by a transfer function with a band pass characteristic. The response of an average individual to the vehicle motions can thus simply be predicted by filtering the measured acceleration signal of the motion with such a band pass characteristic. The filtered signal then gives a direct indication of the gravity of the motion sickness. Optionally, the transfer function can be adjusted to personal conditions with the aid of adjustable weight and amplification factors.

Furthermore, the invention relates to an apparatus for detecting and signaling potentially sickening motions, characterized by the measures according to claim 8.

With an apparatus according to the invention it can be predicted whether a specific motion can cause motion sickness, when an individual, for example a passenger of a vehicle, would be exposed to this motion for a prolonged time. For this purpose, the apparatus has been provided with measuring means for measuring a motion parameter that is representative of motion sickness, for example an acceleration of the motion. The measured motion parameter is then, with the aid of evaluation means present in the apparatus, compared with values or patterns known from practice to be permissible from the viewpoint of motion sickness. The evaluation means can also comprise an algorithm in which a relation between the motion parameter involved and its effect on motion sickness is fixed, and on the basis of which the sickening effect of the measured signal can be estimated. In addition, the apparatus comprises rendering means, for example a LED, LCD display, alarm or loudspeaker, with which the outcome of the evaluation means can be communicated to the user. Optionally, signal processing means can be provided between the measurement and evaluation means, for example for eliminating measurement peaks and measurement noise, in order to obtain a reliable prediction.

In a particularly advantageous embodiment, an apparatus according to the invention is characterized by the measures according to claims 10-12.

The applicant has demonstrated that the degree to which a motion can cause motion sickness can be predicted by the response of a band pass filter to the acceleration of the motions involved. Here, the band pass filter has a peak of around approximately 0.16 Hz, a first cut-off frequency between approximately 0.01 and 0.16 Hz and a second cut-off frequency between approximately 0.16 and 1 Hz. Such a band pass filter can be used to evaluate the sickening effect of the signal measured by the acceleration transducer in a simple yet accurate manner.

In a further elaboration, an apparatus according to the invention is characterized by the measures according to claim 13.

Since the evaluation means work with general data, based on the response of an average person, the apparatus is preferably provided with adjustment means, in order to tune the sensitivity of the indicator to the susceptibility of a specific interested party, for example a passenger. The adjustment means can comprise, for example, an amplification factor, by which the outcome of the evaluation means is multiplied.

The adjustment means can be manually operated means, but can also be of a self-learning nature. In the latter case, adjustment to the individual takes place 'automatically', based on feedback information received from the individual during use. This self-learning embodiment is particularly advantageous when the apparatus is used by only one person or a small number of persons. In the second case, preferably memory means are provided, in which the personal preferred settings of different users can be stored, so that these can be retrieved with a single preference button.

In the further subclaims further advantageous embodiments of a method for the prevention of motion sickness and an apparatus for detecting potentially sickening motions are described.

BRIEF DESCRIPTION OF THE DRAWINGS

In order to clarify the invention, an exemplary embodiment of an apparatus according to the invention for detecting motions that cause motion sickness as well its operation and a possible application of this will be elucidated in more detail with reference to a drawing. In the drawings.

DETAILED DESCRIPTION OF THE INVENTION

Figure 1:
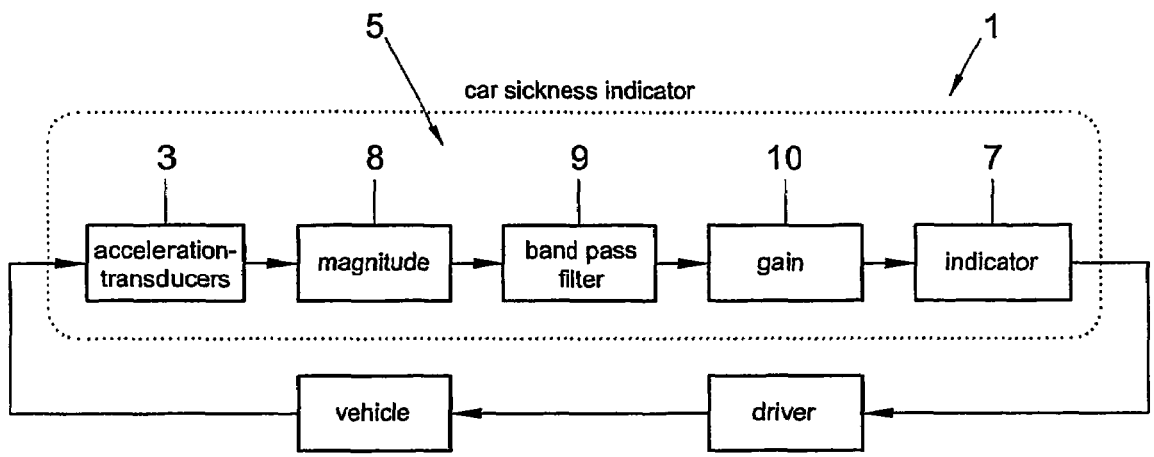
FIG. 1 shows a schematic overview of the various parts of an apparatus for detecting motions causing motion sickness according to the invention.

FIG. 1 schematically shows an apparatus 1 according to the invention, hereafter also referred to as motion sickness indicator, for detecting motions that potentially cause motion sickness. The motion sickness indicator 1 comprises measuring means 3, evaluation means 5 connected thereto, and connected to these evaluation means 5 rendering means 7.

The measuring means 3 are arranged for measuring a relevant parameter for motion sickness of the motions. The applicant has demonstrated that the acceleration is such a relevant parameter. On the basis of the acceleration, a good prediction can be made with regard to the sickening effect of a motion. For this reason, the measuring means 3 comprise one or more acceleration transducers with which the acceleration of a motion acting on the apparatus 1 during use can be measured, preferably in three orthogonal directions ($a_x$, $a_y$, $a_z$). Optionally, the acceleration can be measured in two or only one direction, but since motions can generally be provoking with regard to motion sickness in all three directions, the most accurate prediction can be obtained on the basis of a three-dimensional signal. Acceleration transducers are sufficiently well-known from practice and therefore do not require further specification.

The evaluation means 5 are used to predict the sickening effect of the motion on the basis of the measured accelerations. For this purpose, the evaluation means 5 comprise calculation means 8, comparison means 9 and adjustment means 10. The calculation means 8 are used to calculate a total acceleration signal (a) on the basis of the measured acceleration components ($a_x$, $a_y$, $a_z$), for example according to the following unweighted addition:

$$a = \sqrt{a_x^2 + a_y^2 + a_z^2}.$$

Figure 2:
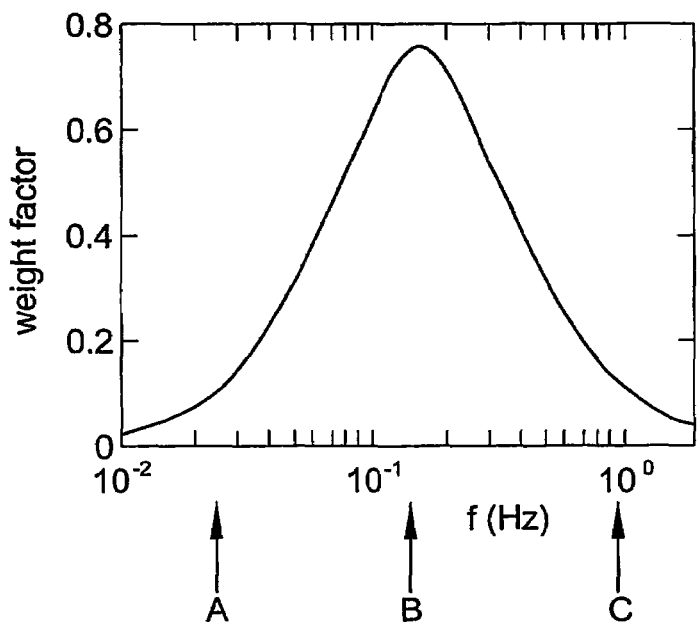
FIG. 2 shows a transfer function of a suitable filter for application in an apparatus according to the invention.

The total acceleration signal (a) is then passed through the comparison means 9. These comparison means 9 include knowledge gathered from practice concerning the response of a normal population to such an acceleration signal. This knowledge can be incorporated in the comparison means 9, for example, in the form of a table with permissible threshold values or a permissible acceleration pattern. Preferably, however, this knowledge is fixed in a dynamic model. It has been found that the degree to which an average individual gets motion sick due to a specific motion can be modeled as a band pass characteristic, as shown in FIG. 2. This characteristic has both a high-pass and a low-pass character. The high-pass part is used to filter out the gravity acceleration component of the total acceleration signal (a). For this purpose, the high-pass part has a first cut-off frequency (A) of, for example, between approximately 0.01 and 0.16 Hz. The low-pass part has a second cut-off frequency (C) of between approximately 0.16 and 1 Hz. With this, higher frequencies, above approximately 1 Hz, are filtered out, since these do not generally cause motion sickness. The peak sensitivity (B) of this characteristic is around approximately 0.16 Hz. Such a characteristic can be implemented in the evaluation means 5, for example, in the form of a band pass filter.

Incidentally, motion sickness can also be predicted on the basis of the separate acceleration components ($a_x$, $a_y$, $a_z$), whereby the sickening effect can be determined for each acceleration component, optionally with a separate filter. However, using the total acceleration signal has the advantage that, because only the measured acceleration magnitude is used as an input signal for the filter, the orientation of the acceleration transducer in relation to the vehicle becomes irrelevant. This is particularly favorable when the motion sickness indicator can be fitted in the vehicle as a loose instrument.

Furthermore, in the evaluation means 5, an algorithm can be incorporated that, when evaluating the sickening effect of specific motions, takes the factor time into account, in particular the period during which the sickening motions occur, the motion history of the vehicle from the moment of starting up, and the delay in the response of an average passenger to such sickening motions. For it is known that motion sickness normally becomes manifest only upon continued exposure to specific motions. A time-dependent algorithm can factor this in.

Research by the applicant has shown that such a time-dependent evaluation algorithm can be modeled as a second-order low-pass filter with a time constant which is round about 12 minutes. This is graphically represented in FIG. 3, in uninterrupted lines, with a constant vehicle motion being entered as a fictitious input signal. The degree of sickening (plotted on the vertical axis, on the left side of FIG. 3) can be expressed, for example, as the percentage of a normal population, which would actually have to vomit under the given conditions. This degree will increase as the sickening motions are more violent and/or continue longer, while the degree will decrease when the sickening motions are temporarily less violent or even completely absent, for example because the driver of the vehicle reacts well to the instantaneous degree and, on the basis of this, corrects his driving behavior, or, for example, because the vehicle is temporarily stationary.

Figure 3:
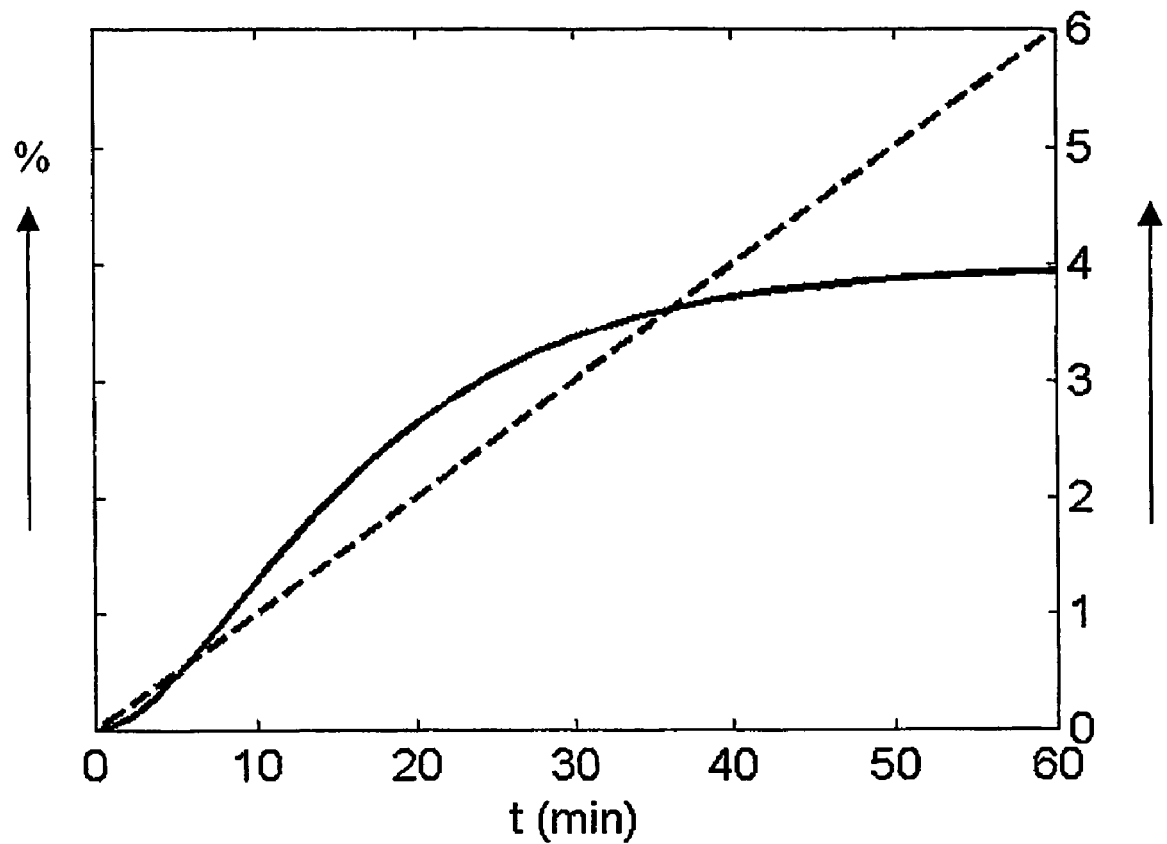
FIG. 3 shows a graphic representation of two alternative methods for evaluating the sickening effect of a measured signal.

Furthermore, in addition to or instead of the evaluation method mentioned above, the evaluation means 5 can include an algorithm, which can monitor a cumulative measure, which quantifies the sickening effect over the whole drive. This measure is obtained by integrating the instantaneous measure for motion sickness in the time. At a constant vehicle motion, this yields a straight line, as shown in FIG. 3 in interrupted lines, the unit (plotted on the vertical axis, on the right side) being arbitrary. As shown in FIG. 3, this measure only increases in time.

Such a cumulative drive value has the additional advantage of storing information relating to the driving behavior of the driver. This information can be advantageously employed, for example, for didactic or administrative purposes.

Furthermore, the evaluation means 5 comprise adjustment means 10, which can be used to adjust relevant factors for the evaluation, which can vary depending on user or condition of use, such as, for example, the temperature in the vehicle, the age of the occupant or a personal susceptibility factor, with which the susceptibility differences between different users can be factored in. Thus, this allows the indicator to be optimally adjusted for every user and every situation.

The adjustment means 10 can be equipped in such a manner that the user can adjust them manually, but they can also be of a self-learning nature. In the latter case, the adjustment means will, in the course of use, adopt an optimum value through interaction with the user. Preferably, memory means (not shown) are provided, in which preferred settings for different users or conditions are stored, so these can be retrieved with a single preference button.

Furthermore, the motion sickness indicator 1 is provided with rendering means 7, with which the outcome of the evaluation means 5 can be presented in a suitable manner. Depending on the type of information to be conveyed, various rendering means 7 are possible. In a simplest embodiment, the rendering means 7 can comprise, for example, a LED or alarm signal to indicate whether the evaluated motions are sickening or not. In a more advanced embodiment, the indicator 1 can also indicate to what degree the motions are sickening, for example by means of differently colored LEDs (green for non-sickening motions, orange when the motions are on the verge and red when the motions are sickening), a mounting pointer, or an alarm with increasing volume or frequency.

In an even further elaborated embodiment, the motion sickness indicator can further give instructions on how to adjust the provocative motions in order to minimize the sickening effect. Such information can be shown on an LCD display, for example.

An apparatus according to the invention can be used, for example, in a vehicle to help the driver to control his driving behavior in such a manner that this is as little sickening as possible for a fellow passenger. Since the driver himself does not usually get sick, it is difficult for him to judge to what degree his driving style can cause motion sickness in fellow passengers. Of course these fellow passengers can indicate this themselves, but then it is often too late, in other words, they already feel sick. A motion sickness indicator according to the invention can be used to signal motions associated with motion sickness at an early stage, long before these actually cause motion sickness, and allows the driver to adjust his driving style in time. For this purpose, the motion sickness indicator 1 can be fitted in the vehicle or to a passenger prior to the drive. Of course, the indicator can also be integrated in the vehicle as a standard accessory. Herein, the term 'vehicle' is to be construed in a broad sense, including at least any means of transport on land, but vessels and aircraft also belong to the means of transport for which application of the motion sickness indicator 1 is possible. The thus installed motion sickness indicator 1 will evaluate the motions present in the car during the drive for their sickening effect and will give feedback on the outcome to the driver or a steering system of the vehicle. In a particularly advantageous embodiment, the information presented is differentiated on the basis of the origin of the motions (braking, accelerating, bends), so the driver can see exactly which driving actions cause motion sickness and how he can adjust these.

The invention is by no means limited to the exemplary embodiment shown in the description and the drawing. Many variations on this example are possible within the framework of the invention outlined by the claims.

For example, other relevant motion parameters, such as the angular speed, can be used to predict motion sickness.

These and comparable variations are considered to fall within the scope of the invention outlined by the claims.

The invention claimed is:

1. A method for the prevention of motion sickness in occupants of a vehicle, comprising
    fitting a motion sickness indicator in the vehicle,
    indicating using the indicator whether vehicle motions experienced by the occupants during use can cause motion sickness when the occupants are persistently exposed to these motions,
    feeding information coming from the indicator back to a driver or a steering system of the vehicle, and
    adjusting the steering of the vehicle in such a manner that sickening motions are minimized.

2. A method according to claim 1, wherein the motion sickness indicator measures the vehicle motion, at any rate at least one parameter thereof relevant for motion sickness, and predicts a sickening effect of the measured signal on the basis of a relation between the measured parameter and motion sickness known from practice, after which the outcome of the evaluation is presented to a driver and/or steering system of the vehicle with the aid of rendering means suitable therefor.

3. A method according to claim 2, wherein the predicted sickening effect is based on the acceleration of the vehicle motion, which acceleration is measured in at least one direction.

4. A method according to claim 3, wherein the acceleration of the vehicle motion is measured in three, substantially orthogonal directions ($a_x$, $a_y$, $a_z$), after which the sickening effect of each acceleration signal is determined separately, with the aid of a relation specifically determined for the direction involved.

5. A method according to claim 3, wherein the acceleration of the vehicle motion is measured in three, substantially orthogonal directions ($a_x$, $a_y$, $a_z$), after which one scalar total acceleration (a) is determined according to $a=\sqrt{a_x^2+a_y^2+a_z^2}$ after which the sickening effect of the vehicle motion is determined on the basis of this total acceleration, with the aid of a relation determined on the basis of practical data.

6. A method according to any one of the claims 3-5, wherein the relation between the measured acceleration and the degree to which this acceleration can result in motion sickness is modeled as a transfer function with a band pass characteristic.

7. A method according to claim 2, wherein the relation incorporated in the motion sickness indicator that represents a susceptibility of a normal population to motion sickness, can be adjusted, during use through interaction of an occupant of the vehicle with the indicator, to a specific relation that is representative for the occupant.

8. An apparatus for detecting and signaling potentially sickening motions, comprising
    a transducer for measuring a relevant parameter for motion sickness of a motion experienced by the apparatus,
    evaluation means for comparing the measured motion parameter with empirical data concerning the sickening effect of comparable motion parameters, on the basis of which the sickening effect of the measured parameter can be estimated, and
    rendering means for presenting an outcome obtained by means of the evaluation means to a user in a suitable manner.

9. An apparatus according to claim 8, wherein the measured motion parameter is an acceleration of the motion.

10. An apparatus according to claim 8, wherein the evaluation means comprise a band pass filter.

11. An apparatus according to claim 10, wherein the filter has a peak of between approximately 0.08 and 0.3 Hz, in particular between approximately 0.1 and 0.2 Hz and preferably around approximately 0.16 Hz.

12. An apparatus according to claim 10, wherein the band pass filter has a first cut-off frequency of between approximately 0.01 and 0.16 Hz and a second cut-off frequency of between approximately 0.16 and 1 Hz.

13. An apparatus according to claim 9, wherein the apparatus comprises adjustment means, for adjusting at least one amplification factor, making a susceptibility of the apparatus adjustable to an individual user's susceptibility to motion sickness.

14. An apparatus according to claim 13, wherein the adjustment means are self-learning.

15. An apparatus according to claim 8, wherein the apparatus comprises a housing, which is provided with fasteners, for fitting the apparatus positionally fixed in, for example, a vehicle or vessel or to a passenger.

16. An apparatus according to claim 8, wherein the evaluation means comprise a low-pass filter, for determining a time-dependent degree of sickening, in particular depending on a motion history, a time over which sickening motions occur and/or an average response time of a passenger to such sickening motions.

17. An apparatus according to claim 16, wherein the low-pass filter has a time constant of between approximately 10 and 15 minutes, preferably approximately 12 minutes.

18. An apparatus according to claim 8, wherein the evaluation means comprise an integrator, for determining a cumulative degree of sickening, measured over a specific period of time.

* * * * *